United States Patent [19]

Hoselton

[11] Patent Number: 4,674,977
[45] Date of Patent: Jun. 23, 1987

[54] HEATED STEAM HOSE DRUM

[75] Inventor: Richard Hoselton, 15431 Treetop Dr., Orland Park, Ill. 60462

[73] Assignees: Richard Hoselton; James D. Murray, both of Orland Park, Ill.

[21] Appl. No.: 791,346

[22] Filed: Oct. 25, 1985

[51] Int. Cl.[4] ............................................. F27B 9/00
[52] U.S. Cl. .................................. 432/120; 432/225; 137/883
[58] Field of Search ................ 432/120, 62, 225, 231, 432/232; 137/883

[56] References Cited

U.S. PATENT DOCUMENTS 4,172,747  10/1979  Wolfe ................................. 432/225
4,553,925  11/1985  Bricmont ........................... 137/883

Primary Examiner—Henry C. Yuen
Attorney, Agent, or Firm—Russell E. Hattis; Lawrence J. Bassuk

[57] ABSTRACT

A closable drum having a heating coil therein safely stores a steam hose or unused lengths of the steam hose in an internal chamber thereof. A steam supply control valve connects a fixed steam outlet to the interior the chamber for connection to one end of the steam hose, allowing the other end of the hose to extend from the chamber. A heating coil control valve, also connected to the fixed steam outlet, controls the steam supplied to the heating coil. A perforated wall supported above the heating coil spaces the steam hose from the heating coil and allows heated air to rise into the chamber.

9 Claims, 3 Drawing Figures

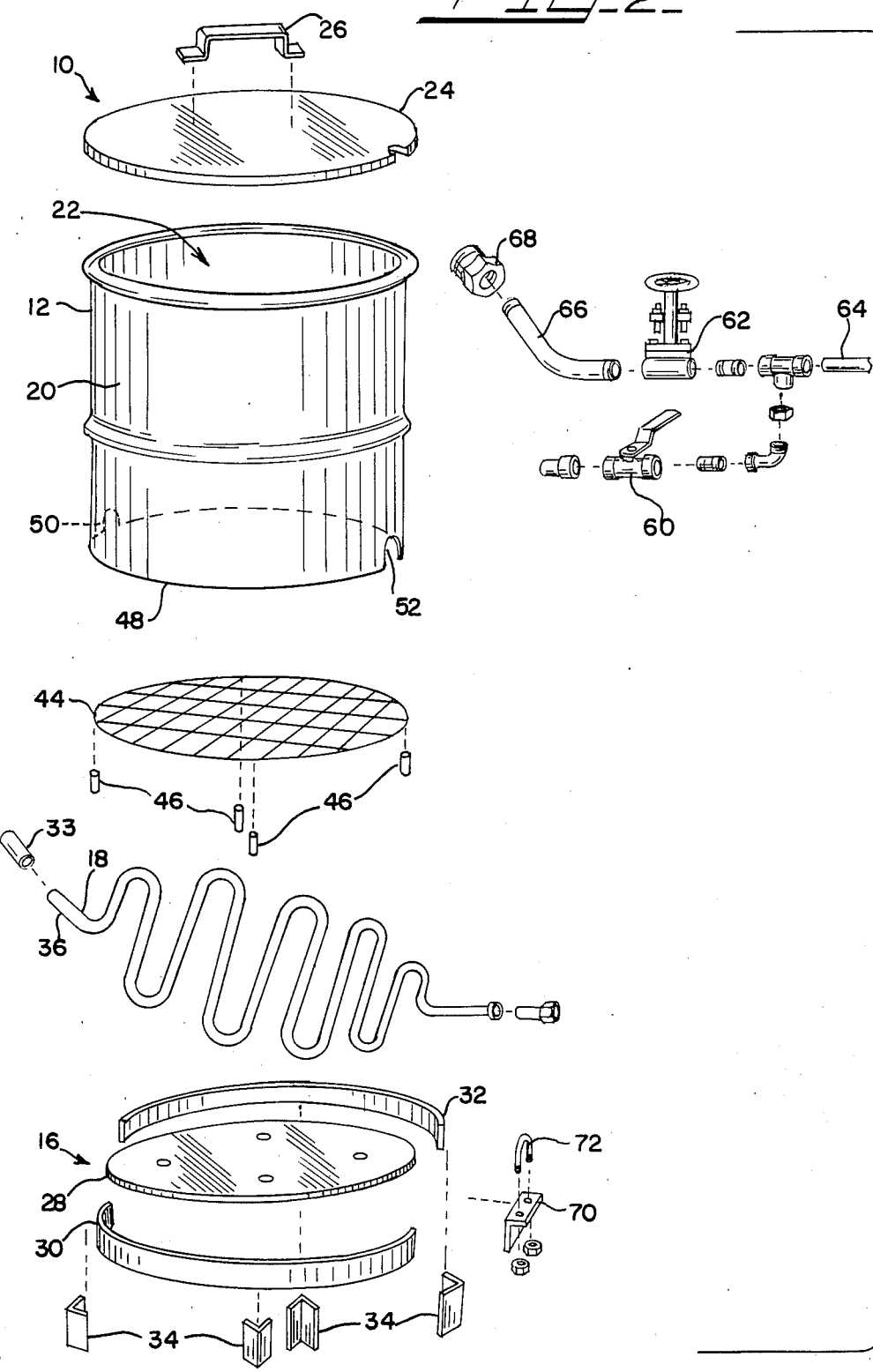

HEATED STEAM HOSE DRUM

DESCRIPTION

Background of the Invention

This invention relates generally to an apparatus for conveying steam from a fixed wall outlet to desired locations, and particularly, to storing flexible steam hoses in a steam heated environment without bleeding steam through the hose.

Flexible hoses are used to conduct steam from a fixed wall outlet or gate valve to the desired point of use and previously were left lying on the ground, landings or towers when not used. This practice leaves the hose in a position where it can be easily tripped over and causes several problems in winter when the temperatures are below the freezing point of water. A small amount of steam must constantly be bled through the gate valve and hose to prevent contained, condensed water from freezing and blocking the hose. This results in a substantial energy loss. Further a slippery and dangerous frozen pond of condensed water forms at the free end of the hose that can cause people to fall and injure themselves, or the formation on landings or pipes and towers of icicles that can fall and injure people and equipment. Additionally, bleeding steam through the hose reduces visibility due to fogging of the cold air and decreases the life of the gate valve and hose due to constant erosion. A steam trap attached to the free end of the hose is impractical because conventional hose fittings do not usually fit over the fittings of conventional steam traps.

SUMMARY OF THE INVENTION

In accordance with the invention, a drum-like container stores a steam hose in an internal chamber heated by steam passing through a heating coil. Separate valves control the steam supplied to the heating coil and the hose. Lengths of the hose can remain coiled in the drum while the free end of the hose supplies steam to desired locations.

In accordance with a more specific aspect of the invention, the container may be an open ended drum body resting on a base or pedestal forming a bottom wall. A removable cover may be provided to close the open top of the drum body. The control valves may be mounted on the base and connected for selectively supplying and controlling the amount of steam fed thereto in parallel from a fixed outlet or source to the hose and heating coil.

The hose is coiled in the drum and preferably rests on a sheet of expand metal supported above the heating coil by legs to avoid damaging the heating coil, and the base is preferably supported above the ground by legs.

In freezing temperatures when the steam hose is not in use, the hose control gate valve is closed with the hose stored in the drum chamber. The heating coil control valve is opened to provide steam to the heating coil which heats the interior of the drum and hose. Condensed water from the heating coil is preferably returned to the steam source through a steam trap connected thereto. The heated steam hose is free of any ice plugs which can interfere with the immediate use of the steam hose when its control valve is opened. The preferred form of the invention overcomes the other previously mentioned problems and reduces steam losses by 75%.

The heat savings result from the steam hose being stored completely closed off from the steam source and the amount of steam that passes through the heating coil, which is shorter and of a smaller diameter than the steam hose, being less than that needed to effectively bleed the steam hose when the present invention is not being used. Additionally, terminating the heating coil in a steam trap further reduces the amount of steam needed only for heating the drum chamber.

Other advantages and features of the invention will become apparent upon making reference to the specification, claims, and drawings to follow.

BRIEF DESCRIPTION OF THE DRAWINGS

FIG. 2 is an exploded perspective view of the heated, steam hose drum; and

DESCRIPTION OF THE PREFERRED EMBODIMENT

Figure 1:
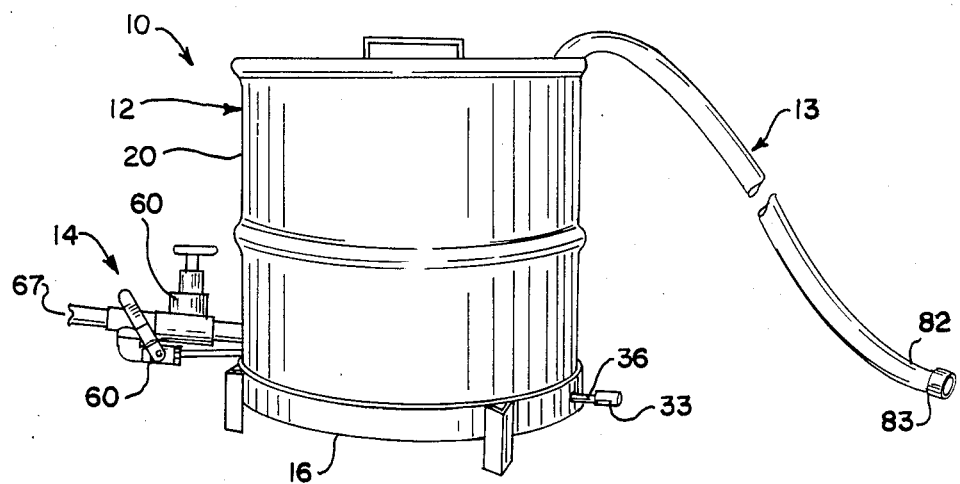
FIG. 1 is a perspective view of a heated steam hose drum of the invention connected to a fixed wall outlet and with a length of steam hose operatively extending therefrom.
Figure 3:
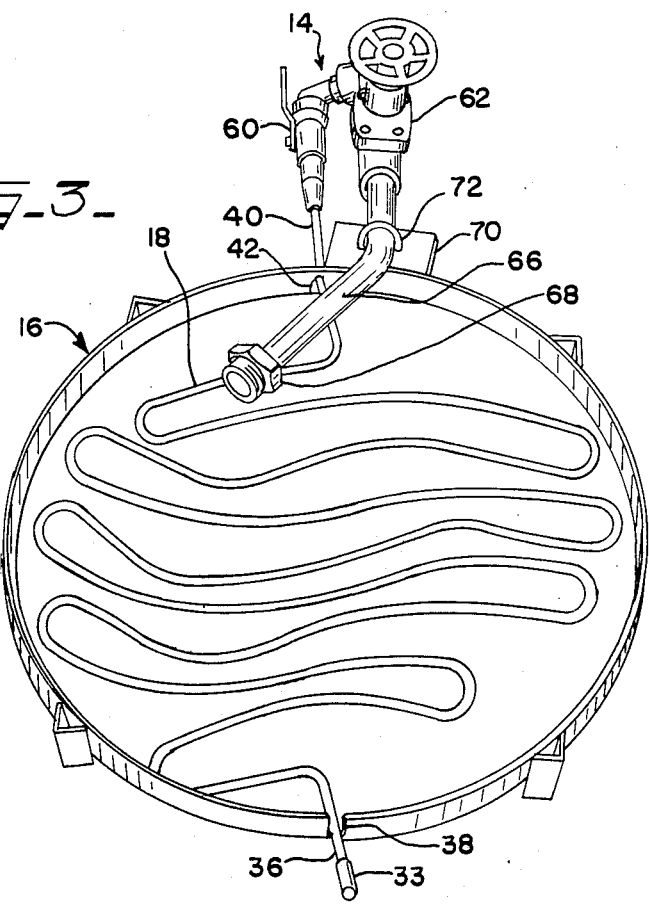
FIG. 3 is a perspective view of the heated steam hose drum base to show the relative position of the two valves and heating coil.

Referring to FIGS. 1, 2, and 3, a heated steam hose-storing drum assembly 10 comprises a vertically oriented, hollow, preferably cylindrical container 12, a double valve means or assembly 14 mounted at a base 16 of the container 12 and a sinuous, copper tube heating coil 18 of much smaller diameter and shorter length than the steam hose 13 to be used therewith. For example, the copper tubing may have a diameter of $\frac{3}{8}''$ while the hose 13 has a diameter of $\frac{3}{4}''$.

Container 12 is formed by an upstanding open-ended cylindrical wall 20 preferably formed from the top two-thirds of a 55 gallon open topped steel drum to define an internal chamber 22. Container 12 also includes a cover 24 with a handle 26 and the base 16. Base 16 is formed of a circular plate 28 of steel with two strips of sheet stock 30 and 32 secured to the peripheral edge thereof by welding to form an upstanding rim. The base 16, forming a bottom wall or pedestal of the container, also includes feet 34 formed by short lengths of angle iron secured to the bottom of plate 28 by welding.

The heating coil 18 is mounted in the chamber 22 resting on the top surface of base 16 with one end 36 passing through a slot 38 of the base between the ends of strips 30 and 32, where it connects with a steam trap 33, and the other end 40 passing through an opposed, like slot 42 between the ends of strips 30 and 32. A circular grating 44 of wire mesh or expanded metal forming a perforated wall is supported above heating coil 18 by feet 46 resting on the base plate 28 to protect the heating coil from damage resulting from a coiled steam hose in the chamber otherwise resting on the heating coil.

The lower edge 48 of the container wall 20 rests on the top surface of base plate 28 within the rim formed by the two strips 30 and 32 and includes two notches 50 and 52 to accommodate the ends 36 and 40 of the heating coil 18 passing therethrough.

Valve means 14 includes two valves, a ball heating control valve 60 and a gate steam supply valve 62 both connected to a pipe 64 intended to be connected to a fixed steam outlet, such as 67 in FIG. 1. Valve 60 is connected to end 40 of the heating coil 18 and controls the amount of steam supplied to heating coil 18 in the chamber 22 of drum 12 for keeping the air in said chamber above the freezing point of water in cold weather.

Steam supply valve 62 is connected to a length of pipe 66 extending into chamber 22, also through notch 52, and terminates in a steam hose spud 68. Pipe 66 is bent to approximately a 45° angle to facilitate the circular coiling of a steam hose in the chamber 22. Pipe 66, and thereby valve means 14, are secured to base 16 by a bracket 70 welded to base 16 and a U-bolt 72 passing over pipe 66 and through bracket 70. Valve 62 controls the quantity of steam provided to a steam hose 13 connected to the spud 68 in chamber 22.

Referring to FIG. 1, the drum assembly 10 is mounted adjacent the steam outlet 67 on a floor or landing 76. A length of steam hose 13 is connected by a conventional hose fitting to the spud 68 in the chamber 22 and a free end 82 of the steam hose having the usual complementary fitting 83 is carried to a desired location and connected to a device for supplying steam thereto. The remaining length of hose can be retained in chamber 22 to keep it neat, avoid abrasion from the floor and avoid people tripping over it.

In cold weather, the steam hose 13 can completely be coiled up and stored in container 12 when not being used. Gate steam supply valve 62 is then closed and ball heating control valve 60 is slightly opened to bleed a small amount of steam therethrough. The condensate in the hose is maintained above freezing by the heat supplied from the heating coil 18. The steam hose 13 thus is always stored neatly and safely coiled and is maintained ready for use at any time.

In a specific embodiment of the invention, the base plate 28 may be made from ¼" steel sheet metal while the rim strips 30 and 32 are 2" wide flat stock. The slots 38 an 42 can be formed by spacing the strips 30 and 32 or by drilling therethrough. The heating coil used may be ⅜" copper tubing.

Steam supply valve 62 is a gate valve while heating control valve 60 is a brass ball valve that well withstands the erosion of bleeding steam through to the heating coil. Various interconnections and fittings as desired connect together valves 60 and 62.

Variations of the invention are possible while remaining within the claims of the invention. For example, a different size and geometric configuration of the container 12, base 16, and heating coil 18 are possible. Also, different types of valves can be used for valves 60 and 62 to obtain the excellent wear characteristics of ball valve 60 for bleeding steam through the heating coil and to obtain the good supply characteristics of gate valve 62. Various other fittings can be used to join the two valves together and to the fixed steam outlet 67.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. A container assembly adpated to store a steam hose in a heated environment therein, said container assembly comprising:
   an upstanding container body closably at its upper and lower ends to form an enclosed hose storage chamber therein;
   a heating coil in the bottom portion of said chamber adapted to retain steam therein while radiating heat into said hose storage chamber;
   steam valve means having an inlet adapted to be connected to a source of steam, said steam valve means including first valve means adapted to be connected to said steam hose for controlling steam supplied thereto from said source and second valve means connected to the inner end of said heating coil for controlling steam supplied thereto from said source, the heating coil thereby heating said enclosed chamber; and
   a steam trap connected to the outer end of said heating coil.

2. A container assembly adapted to store a steam hose in a heated environment therein, said container assembly comprising:
   an upstanding container body closably at its upper and lower ends to form an enclosed hose storage chamber therein;
   a heating coil in the bottom portion of said chamber adapted to retain steam therein while radiating heat into said hose storage chamber;
   a perforated wall supported above said heating coil for carrying the steam hose spaced from the heating coil and allowing heated air to rise into said chamber; and
   steam valve means having an inlet adapted to be connected to a source of steam, said steam valve means including first valve means adapted to be connected to said steam hose for controlling steam supplied thereto from said source and second valve means connected to the inner end of said heating coil for controlling steam supplied thereto from said source, the heating coil thereby heating said enclosed chamber.

3. The container assembly of claim 2 in which said heating coil is shorter and has a smaller diameter than said steam hose.

4. The container assembly of claim 2 including a base upon which said container body and heating coil rest.

5. The container assembly of claim 2 wherein there is at least one opening in said assembly through which the outer end of said heater coil is exposed to the outside of said assembly, and a steam trap connected to the outer end of said heating coil outside said assembly.

6. The container assembly of claim 2 wherein the chamber of said container body is closed by a removable cover movable to a position to open the chamber of said container body for hose removal.

7. A container assembly adapted to store a steam hose in a heated environment therein, said container assembly comprising:
   an upstanding container body closably at its upper and lower ends to form an enclosed hose storage chamber therein;
   a heating coil in the bottom portion of said chamber adapted to retain steam therein while radiating heat into said hose storage chamber;
   a base upon which said container body and heating coil rest, including a rim extending above the circumference of the base and within the bottom of the container extends; and steam valve means having an inlet adapted to be connected to a source of steam, said steam valve means including first valve means adapted to be connected to said steam hose for controlling steam supplied thereto from said source and second valve means connected to the inner end of said heating coil for controlling steam supplied thereto from said source, the heating coil thereby heating said enclosed chamber.

8. The container assembly of claim 7 including at least one opening through the rim through which passes the outer end of said heating coil.

9. The container assembly of claim 8 which includes an opening through which the inner end of said heating coil is exposed and said steam valve means being connected to said inner end of said heating coil outside said assembly.

* * * * *